Aug. 18, 1925.
W. S. HARLEY
DISK CLUTCH
Filed March 21, 1925
1,549,976
2 Sheets-Sheet 2
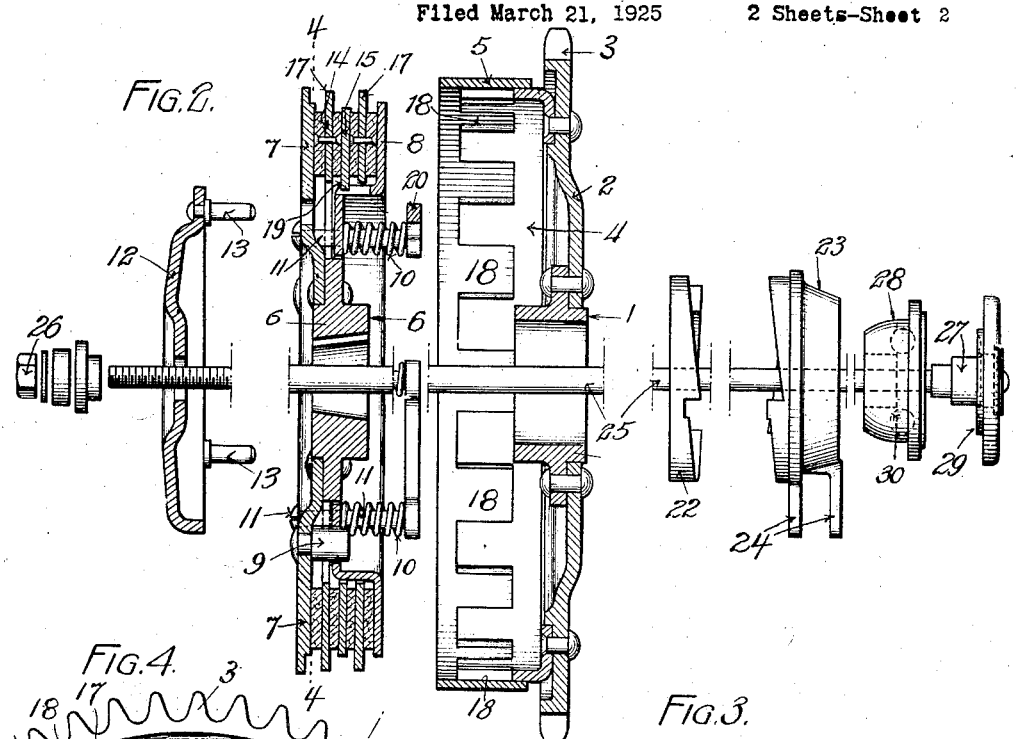
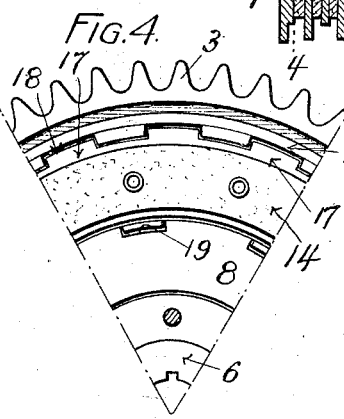
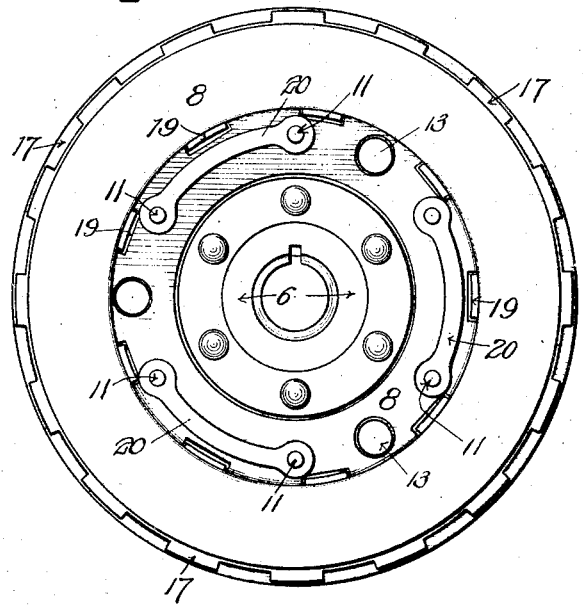
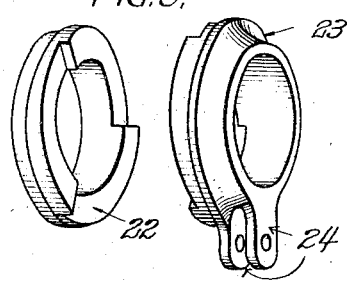
INVENTOR:
WILLIAM S. HARLEY
By Edwin B. H. Tower, Jr.
ATTY.

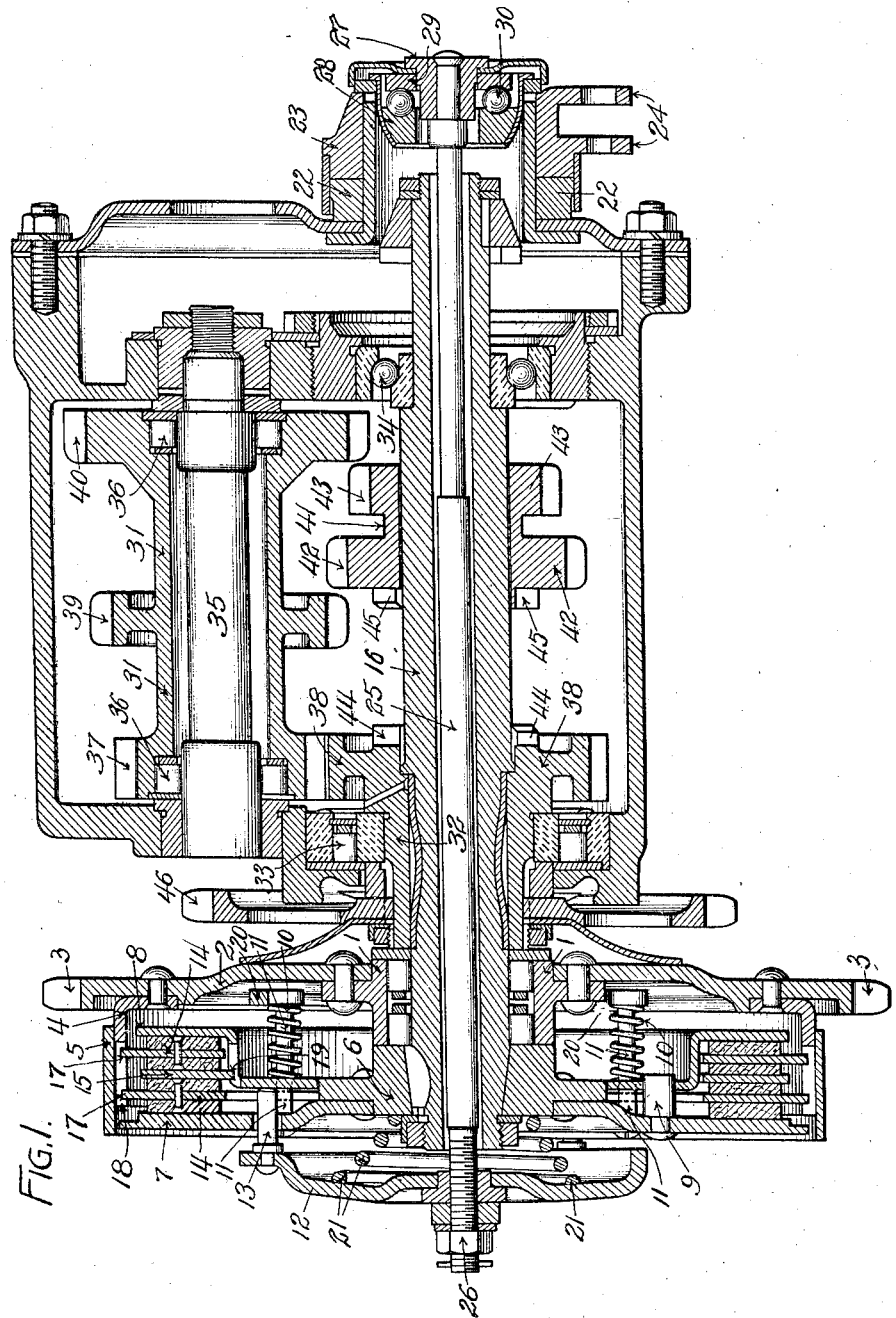

Patented Aug. 18, 1925.

1,549,976

UNITED STATES PATENT OFFICE.

WILLIAM S. HARLEY, OF MILWAUKEE, WISCONSIN, ASSIGNOR TO HARLEY-DAVIDSON MOTOR CO., OF MILWAUKEE, WISCONSIN, A CORPORATION OF WISCONSIN.

DISK CLUTCH.

Application filed March 21, 1925. Serial No. 17,330.

*To all whom it may concern:*

Be it known that I, WILLIAM S. HARLEY, a citizen of the United States, residing at Milwaukee, in the county of Milwaukee and State of Wisconsin, have invented new and useful Improvements in Disk Clutches, of which the following is a specification.

This invention relates to a disk clutch.

An object of the invention is to provide a clutch in which the driving and driven members thereof are two independent units which are freely separable from each other.

Another object is to provide a clutch in which each member may be applied to the same shaft and removed therefrom separately.

Another object is to provide a clutch in which access may be readily had to the interior parts thereof.

Another object is to provide a clutch which may be quickly engaged and released.

Another object is to provide a clutch which is narrow and which has a high capacity for a given size.

Another object is to provide a clutch in which the parts may be readily inspected, repaired and replaced.

Another object is to provide a clutch which may be readily and economically manufactured and which will be efficient and durable.

Another object is to provide a clutch which is narrow and compact for a given capacity.

Other objects and advantages of the invention will hereinafter appear.

According to this invention, the driving and driven members of the clutch are each an independent unit and the hubs thereof are in alinement and side by side.

These unitary members are readily separable from each other by simply drawing them apart sidewise, are mountable upon the same shaft, and may be separately applied to and removed from this shaft.

The driven member is provided with a fixed gripping plate, a movable gripping plate, a driving disk or disks between the gripping plates, a spring or springs to cause the disks to be gripped or clamped between the gripping plates, and a releasing plate arranged on the outside of the fixed gripping plate and having pins or other means passing through this gripping plate and engaging the movable gripping plate.

The releasing plate is operated by a face-cam or other actuator with a stationary face-cam and a movable face-cam.

As these cams have a steep pitch, a small turn or movement of the movable face-cam will cause the clutch to be engaged or released.

The clutch as particularly set forth herein may be readily reorganized or modified to make the driven member the driving member, and the driving member the driven member.

This clutch is particularly suitable for the change speed gears of a motorcycle or other automotive vehicle as it may be engaged and released quickly by a small movement of its actuator.

This application is a continuation in part of application S. N. 412,480, filed September 24, 1920, as to all matters common to both applications.

The clutch, as shown in the accompanying drawings, is applied to a change speed gear mechanism.

The views in the drawings are as follows:

Fig. 1 is a sectional view of the clutch and change speed gears,

Fig. 2 is a view of the driving and driven members, the releasing plate, the connecting rod and the actuator separated one from another, such members and releasing plate being in section and the rod and the actuator being in elevation, Fig. 3 is a rear view of the driven or outer member, Fig. 4 is an interior view on the line 4—4 of Fig. 2 with the fixed gripping plate removed showing particularly the rotatable interlock between the driving disks and driving member and the interlock between the driven disk and driven member, and Fig. 5 is a perspective of the cam actuator.

Clutch.

The clutch, like the ordinary friction disk clutch, comprises in general, a driving member, a driven member, disks to connect the members, and springs to grip the disks together.

The driving member has a hub 1, a circular plate 2 mounted thereon, a sprocket 3 formed on said plate, an interlocking ring 4 carried by said plate, and a cover ring 5 surrounding said interlocking ring.

The driven member has a hub 6, a fixed circular gripping plate 7 carried thereby, a circular movable gripping plate 8 mounted on guide pins 9 carried by the fixed gripping plate, springs 10 carried by bolts or screws 11 and arranged between nuts on said bolts and the movable gripping plate, a releasing plate 12 having pins 13 passing through the fixed gripping plate and engaging the movable gripping plate, and two driving disks 14 faced with Raybestos or other friction material and an intermediate disk 15 gripped or clamped between the gripping plates.

The driving and driven members are thus made in two independent units which are separable from each other.

These members have the hubs thereof side by side and may be mounted upon the driving shaft 16 of a variable speed mechanism or change speed gear which will be hereinafter described.

Inasmuch as the springs do not exert any pressure between the two members, no end thrust bearings or other means are required to keep these members together.

The driven member is fixed to the shaft by a key and held thereon by a nut.

The driving member is rotatably mounted upon the shaft by roller bearings and kept in place by the driven member.

The driving disks 14 are rotatably interlocked with the driving member by peripheral lugs 17 which enter axial open end slots 18 in the interlocking ring.

These lugs are free to slide in the slots and to be withdrawn axially or endwise therefrom to enable the members to be readily separated.

The driven disk 15 is rotatably interlocked with the driven member by internal lugs 19 which enter slots in a transverse ledge of the movable gripping plate and are free to slide therein.

The springs 10 press the movable gripping plate towards the fixed gripping plate to grip the disks between these plates and thus lock the members together and thereby engage the clutch.

These springs may have the tension thereof adjusted by turning the screws, the nuts of which are connected in pairs by yokes 20 which keep them from turning with the screws and prevent them from becoming loose in use.

As the screws have the heads thereof accessible from the outside, the springs may be adjusted without removing the driven member from the driving member or the shaft.

A coil spring 21 is interposed between the releasing plate and the hub 6 to keep this plate from rattling.

The clutch is released by moving the releasing plate inward by an actuator to cause the movable gripping plate to be shifted backward against its springs to free the disks and thereby unlock the clutch members and enable them to rotate independently.

Actuator.

The clutch may be controlled by any suitable actuator a small movement of which will engage and release the clutch.

The actuator which is illustrated consists of a stationary three-point face cam 22 and a movable three-point face cam 23 which have complementary faces, the movable face cam being provided with lugs 24 by which it may be turned to move it axially backward and forward.

The face cams have a steep pitch so that the movable cam will have a large axial movement with a small turn and thereby engage and release the clutch quickly.

The movable cam is connected to the releasing plate by a connecting rod 25 which is fastened to the releasing plate at one end by a nut 26 threaded thereon and provided at its other end with a head 27.

A ball bearing is interposed between the movable cam and the head 27 to enable the connecting rod to rotate with the driven member and independently of the movable cam, this ball-bearing being provided with a raceway 28 carried by the movable cam, a raceway 29 carried by the head 27, and balls 30 arranged between these raceways.

When the clutch is to be released, the movable cam is turned and thereby it pulls the releasing plate through the connecting rod to retract the movable gripping plate and thereby free the disks.

Variable speed mechanism or change speed gears.

The variable speed mechanism or change speed gears has the driving shaft 16, an intermediate or countershaft 31, and a driven shaft 32.

The driven shaft 32 which is a hollow shaft or sleeve surrounds the driving shaft and is rotatable in bearings 33.

The driving shaft 16 is rotatable in the driven shaft 32 and a bearing 34.

The intermediate or countershaft 31 is rotatably mounted on a spindle 35 by bearings 36 at each end thereof.

The countershaft and the driven shaft are connected by gears 37 and 38.

The countershaft carries an intermediate speed gear 39 and a low speed gear 40.

The driving shaft carries a sliding gear 41 which is splined thereto and has an intermediate speed gear 42 and a low speed gear 43.

The driven shaft and the sliding gear are provided with coupling lugs 44 and 45 adapted to intermesh to lock the sliding gear and the driven shaft to the driving shaft.

The sliding gear has three positions, the neutral position, as shown in the drawings, in which the gears are out of mesh and the driven shaft is disconnected from the driving shaft, the low speed position, the intermediate speed position and the high speed position.

When this sliding gear is moved to the low speed position, the low speed gears 40 and 43 are meshed, when it is moved to the intermediate speed position the intermediate speed gears 39 and 42 are meshed, and when it is moved to the high speed position, the coupling lugs 44 and 45 are interlocked.

When the sliding gear is in the low speed position, power is transmitted through the low speed gears 40 and 43, the countershaft 31 and gears 37 and 38 to the driven shaft, when it is in the intermediate speed position, power is transmitted from the driving shaft through the intermediate speed gears 39 and 42, the countershaft 31 and gears 37 and 38 to the driven shaft, and when it is in high speed position, power is transmitted from the driving shaft through the coupling lugs directly to the driven shaft, the driven shaft being locked to the driving shaft.

The clutch has its driving member connected to the engine by a chain passing over the sprocket 3, and the variable speed mechanism has its driven member connected to the traction wheel by a chain passing over the sprocket 46.

When the clutch is engaged and the variable speed mechanism has its sliding gear in any one of the three position to connect the driving shaft and the driven shaft, power is transmitted from the engine through the clutch, the driving shaft, the variable speed mechanism to the driven shaft, and thence to the traction wheel.

The power may be disconnected from the traction wheel either by releasing the clutch or placing the sliding gear in neutral position.

The variable speed mechanism enables both the speed and torque to be varied under given conditions, the speed being reduced and the torque increased by changing from direct drive to the intermediate speed gears or the low speed gears to increase the gear ratio.

When changing the sliding gear from one position to another to obtain different speeds, the clutch is momentarily released.

As the clutch may be released and re-engaged quickly by a small back and forth movement of the actuator, it is particularly adapted to be employed with change speed gears.

Of course, various modifications may be made in the clutch particularly set forth herein for the purpose of disclosing the invention.

What is claimed as new and patentable is:

1. A disk clutch comprising independent driving and driven members having the hubs thereof side by side in axial alinement mountable upon the same shaft and separately removable therefrom as units, a fixed gripping plate and a movable gripping plate carried by one member, a spring carried by said fixed gripping plate and exerting pressure upon the said movable gripping plate, a disk gripped between said gripping plates and rotatably interlocked with the other member and freely removable sidewise therefrom, a releasing plate outside of said fixed gripping plate and having pins passing therethrough to operate said movable gripping plate, and an actuator for operating said releasing plate.

2. A disk clutch comprising independent driving and driven members having the hubs thereof side by side in axial alinement mountable upon the same shaft and separately removable therefrom as units, one member having a fixed gripping plate and a movable gripping plate carried thereby, a spring carried by the fixed gripping plate and exerting pressure upon said movable gripping plate, a disk gripped between the gripping plates and having lugs interlocking with lugs formed on the other member, a removable releasing plate for operating said movable gripping plate, and an actuator for operating said releasing plate.

3. A disk clutch comprising independent drivings and driven members having the hubs thereof side by side in axial alinement mountable upon the same shaft and separately removable therefrom as units, a fixed gripping plate and a movable gripping plate carried by one member, a disk gripped between said gripping plates and rotatably interlocked with the other member, a releasing plate having pins passing through the fixed gripping plate and engaging the movable gripping plate, a rod secured to the releasing plate, and an actuator for moving said rod.

4. A disk clutch comprising independent driving and driven members having the hubs thereof side by side in axial alinement mountable upon the same shaft and separately removable therefrom as units, a fixed gripping plate and a movable gripping plate carried by one member, a disk gripped between said gripping plates and rotatable interlocked with the other member, a releasing plate having pins passing through the fixed gripping plate and engaging the movable gripping plate, and an actuator for moving said releasing plate.

5. A disk clutch comprising independent driving and driven members having the hubs thereof side by side in axial alinement mountable upon the same shaft and separately removable therefrom as units, a fixed gripping plate and a movable gripping plate carried by one member, a spring carried by a screw projecting from the fixed gripping plate and exerting pressure upon the said movable gripping plate, a releasing plate having pins passing through the fixed gripping plate and engaging the movable gripping plate, and an actuator for moving said releasing plate, comprising a stationary face cam and a movable face cam.

6. A disk clutch comprising independent driving and driven members having the hubs thereof side by side in axial alinement mountable upon the same shaft and separately removable therefrom as units, one to be fixed to said shaft and the other to be rotatable thereon, a fixed gripping plate and a movable gripping plate carried by one member, a spring mounted upon the fixed gripping plate and exerting pressure upon the movable gripping plate, a disk having faces of friction material gripped between said gripping plates and rotatably interlocked with the other member and freely removable sidewise therefrom, a releasing plate outside of said fixed gripping plate and having pins passing therethrough to operate said movable gripping plate, and an actuator for operating said releasing plate to shift said movable gripping plate and thereby free said disk and release said clutch members.

7. A disk clutch comprising independent driving and driven members having the hubs thereof side by side in axial alinement mountable upon the same shaft and separately removable therefrom as units, one to be fixed to the shaft and the other to be rotatable thereon, a fixed gripping plate carried by one member, a movable gripping plate carried by pins projecting from the fixed gripping plate, screws projecting from the fixed gripping plate and passing through the movable gripping plate, springs arranged upon said screws between the movable gripping plate and nuts mounted upon the ends of the screws, a disk gripped between said plates and rotatably interlocked with the other member and freely removable sidewise therefrom, and an actuator for operating said releasing plate to shift said movable gripping plate and thereby free said disk and release said clutch members.

In witness whereof, I have hereunto subscribed my name.

WILLIAM S. HARLEY.